(12) United States Patent
Howe

(10) Patent No.: US 7,568,660 B2
(45) Date of Patent: Aug. 4, 2009

(54) AUXILIARY FUEL TANK SYSTEMS FOR AIRCRAFT AND METHODS FOR THEIR MANUFACTURE AND USE

(75) Inventor: Mark E. Howe, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/441,492

(22) Filed: May 26, 2006

(65) Prior Publication Data
US 2006/0214061 A1 Sep. 28, 2006

Related U.S. Application Data

(62) Division of application No. 10/768,267, filed on Jan. 29, 2004, now Pat. No. 7,051,979.

(51) Int. Cl.
*B64D 37/14* (2006.01)
(52) U.S. Cl. .............. 244/135 R; 244/135 C; 137/263; 137/571; 60/734
(58) Field of Classification Search ............ 244/135 C, 244/135 A, 135 R; 60/734, 739; 137/263, 137/256, 266, 571, 572, 575
See application file for complete search history.

(56) References Cited

U.S. PATENT DOCUMENTS

| | | | |
|---|---|---|---|
| 236,238 A | 1/1881 | Memery | |
| 1,351,395 A | 8/1920 | Martineau | |
| 1,357,988 A | 11/1920 | Jerdone | |
| 1,841,663 A | 1/1932 | Miller | |
| 1,987,070 A | 1/1935 | LaBour | |
| RE20,379 E | 5/1937 | Henry | |
| 2,146,729 A | * 2/1939 | Gavin | 137/113 |
| 2,170,136 A | * 8/1939 | Gavin | 137/114 |
| 2,289,868 A | 7/1942 | Berck | |
| 2,332,007 A | 10/1943 | Parker | |
| 2,356,786 A | * 8/1944 | Harman et al. | 137/255 |
| 2,508,906 A | 5/1950 | Cunningham | |

(Continued)

OTHER PUBLICATIONS

DeCrane Aircraft; http://www.patsinc.com/prodnserv/auxiliary.tanks.html; (1 pg).

(Continued)

*Primary Examiner*—Timothy D Collins
*Assistant Examiner*—Benjamin P Lee
(74) *Attorney, Agent, or Firm*—Perkins Coie LLP

(57) ABSTRACT

Auxiliary fuel tank systems for aircraft and methods for their manufacture and use. In one embodiment, an aircraft can include a fuselage, at least one engine, and a fuel system configured to distribute fuel to at least one of the engine and an aerial refueling manifold. The aircraft can further include an auxiliary fuel tank system operably coupled to the fuel system. The auxiliary fuel tank system can include a master tank assembly and at least one slave tank assembly. The master tank assembly can be removably installed in the fuselage, and can include a master tank body configured to hold fuel. The master tank body can be configured to pass through a door in the fuselage without disassembly. The slave tank assembly can be removably installed in the fuselage at least proximate to the master tank assembly, and can include a slave tank body configured to hold fuel.

16 Claims, 11 Drawing Sheets

U.S. PATENT DOCUMENTS

| | | | |
|---|---|---|---|
| 2,516,150 A * | 7/1950 | Samiran | 137/208 |
| 2,535,094 A | 12/1950 | Samiran | |
| 2,547,246 A | 4/1951 | Aspelin | |
| 2,546,034 A | 8/1951 | Seeger | |
| 2,609,118 A | 9/1952 | Cattaneo | |
| 2,736,356 A | 2/1956 | Oates, Jr. et al. | |
| 2,771,090 A | 11/1956 | Macgregor | |
| 2,795,257 A | 6/1957 | Cunningham | |
| 2,823,880 A * | 2/1958 | Bergeson | 244/135 C |
| 2,831,490 A | 4/1958 | Simcock | |
| 2,844,178 A | 7/1958 | Coleman | |
| 2,853,259 A | 9/1958 | Underwood | |
| 2,861,708 A | 11/1958 | Sasserson et al. | |
| 2,926,688 A | 3/1960 | Muma et al. | |
| 2,953,156 A * | 9/1960 | Bryant | 137/263 |
| 2,969,803 A * | 1/1961 | Mosher | 137/98 |
| 2,995,268 A | 8/1961 | Kurtovich | |
| 3,096,054 A | 7/1963 | Ciminaghi | |
| 3,158,193 A | 11/1964 | Anderson | |
| 3,259,066 A * | 7/1966 | Williams et al. | 417/80 |
| 3,275,061 A * | 9/1966 | Williams et al. | 137/263 |
| 3,279,522 A * | 10/1966 | Norris et al. | 137/256 |
| 3,304,724 A | 2/1967 | Blumrich | |
| 3,383,078 A * | 5/1968 | Shohet et al. | 244/135 R |
| 3,627,239 A * | 12/1971 | Hull, Jr. | 244/135 R |
| 3,698,480 A | 10/1972 | Newton | |
| 3,732,668 A | 5/1973 | Nichols | |
| 3,754,601 A | 8/1973 | Linkewich | |
| 3,782,400 A | 1/1974 | Hardison et al. | |
| 3,788,039 A | 1/1974 | Bragg | |
| 3,788,040 A | 1/1974 | Bragg et al. | |
| 3,966,147 A | 6/1976 | Wittko et al. | |
| 3,979,005 A | 9/1976 | Robinson et al. | |
| 4,172,499 A | 10/1979 | Richardson et al. | |
| 4,195,693 A | 4/1980 | Busch et al. | |
| 4,251,005 A | 2/1981 | Sons et al. | |
| 4,426,050 A | 1/1984 | Long | |
| 4,432,515 A | 2/1984 | Jarvineva | |
| 4,530,443 A | 7/1985 | Gorges | |
| 4,624,425 A | 11/1986 | Austin et al. | |
| 4,676,463 A | 6/1987 | Tansill | |
| 4,715,417 A | 12/1987 | Coloney | |
| 4,725,022 A | 2/1988 | Wilform et al. | |
| 4,784,354 A | 11/1988 | Tavano | |
| 4,858,788 A | 8/1989 | Meckenstock | |
| 4,883,410 A * | 11/1989 | Goddard et al. | 417/69 |
| 4,913,380 A * | 4/1990 | Vardaman et al. | 244/135 R |
| 4,932,609 A * | 6/1990 | Secchiaroli et al. | 244/135 C |
| 4,936,389 A | 6/1990 | MacDonald et al. | |
| 4,964,531 A | 10/1990 | Caniglia et al. | |
| 5,031,655 A | 7/1991 | Hebaus | |
| 5,141,644 A | 8/1992 | Forde | |
| 5,217,507 A | 6/1993 | Spirig | |
| 5,236,000 A | 8/1993 | Kizer | |
| 5,321,945 A * | 6/1994 | Bell | 60/39.15 |
| 5,575,441 A | 11/1996 | Gervais et al. | |
| 5,660,358 A | 8/1997 | Grafwallner et al. | |
| 5,776,341 A | 7/1998 | Barnard et al. | |
| 5,816,539 A | 10/1998 | Chan et al. | |
| 5,979,485 A * | 11/1999 | Tuckey et al. | 137/143 |
| 6,076,769 A | 6/2000 | Gallegos | |
| 6,089,252 A | 7/2000 | Braun | |
| 6,123,495 A | 9/2000 | Callahan et al. | |
| 6,125,882 A * | 10/2000 | Kong | 137/558 |
| 6,149,102 A | 11/2000 | Marasco et al. | |
| 6,176,452 B1 | 1/2001 | Gallegos | |
| 6,227,230 B1 | 5/2001 | Huh | |
| 6,231,009 B1 * | 5/2001 | Kong | 244/135 R |
| 6,398,165 B1 | 6/2002 | Mayes | |
| 6,422,514 B1 | 7/2002 | Clark et al. | |
| 6,607,005 B2 * | 8/2003 | Viebahn et al. | 137/574 |
| 6,736,354 B2 * | 5/2004 | Goto et al. | 244/135 C |
| 6,889,940 B1 | 5/2005 | Howe | |
| 7,040,579 B2 | 5/2006 | Howe | |
| 7,051,979 B2 | 5/2006 | Howe | |
| 7,093,798 B2 * | 8/2006 | Whelan et al. | 244/120 |
| 7,337,795 B2 * | 3/2008 | Johnson et al. | 137/1 |
| 7,357,149 B2 * | 4/2008 | Howe | 137/399 |
| 2001/0035211 A1 | 11/2001 | Palvoelgyi | |
| 2003/0121492 A1 | 7/2003 | Wheeler | |
| 2003/0218098 A1 * | 11/2003 | Goto et al. | 244/135 R |
| 2004/0145122 A1 | 7/2004 | Burguete et al. | |
| 2004/0245382 A1 | 12/2004 | Nozaki | |
| 2005/0017131 A1 | 1/2005 | Hale et al. | |
| 2005/0034781 A1 | 2/2005 | Rodousakis et al. | |
| 2005/0051666 A1 * | 3/2005 | Lee et al. | 244/10 |
| 2005/0072880 A1 | 4/2005 | Nolan | |
| 2005/0166967 A1 | 8/2005 | Howe | |
| 2006/0278761 A1 * | 12/2006 | Cutler et al. | 244/135 A |

OTHER PUBLICATIONS

DeCrane Aircraft, "Engineering & Manufacturing"; www.patsinc.com/prodnserv/eng.manufacturing.html; (1 pg).

DeCrane Aircraft, "Auxiliary fuel tanks and Power Units"; www.decraneaircraft.com/pats_text.html; (1 pg).

SFAR 88, PATS Aux Fuel, "PATS Auxiliary Fuel system Compliance"; www.sfar88.com/pats/index.htm; (1 pg).

* cited by examiner

AUXILIARY FUEL TANK SYSTEMS FOR AIRCRAFT AND METHODS FOR THEIR MANUFACTURE AND USE

CROSS-REFERENCE TO RELATED APPLICATIONS

This application is a divisional of U.S. application Ser. No. 10/768,267, filed Jan. 29, 2004 now U.S. Pat No. 7,051,979, which relates to copending U.S. patent application Ser. Nos. 10/768,242, filed Jan. 29, 2004 and 10/768,269, filed Jan. 29, 2004 and issued on May 10, 2005 as Patent No. 6,889,940, which are incorporated herein in their entireties by reference.

TECHNICAL FIELD

The following disclosure relates generally to aircraft fuel tank systems and, more particularly, to auxiliary fuel tank systems that can be installed in aircraft fuselages.

BACKGROUND

Commercial transport aircraft are typically designed to carry a given load of passengers, cargo, or passengers and cargo over a given range. Occasionally, however, the need arises to increase the range of the aircraft to serve other routes. Increasing the range generally requires increasing the fuel capacity of the aircraft.

Another situation in which it may be necessary to increase the fuel capacity of an aircraft occurs when the role of the aircraft changes. For example, some military aircraft may serve as aerial refueling tankers at one point in time and cargo carriers at another. In the refueling tanker role, auxiliary fuel tanks can be installed in the body (i.e., the fuselage) to increase the amount of fuel that can be off-loaded to other aircraft in flight. In the cargo carrier role, the body tanks can be removed to increase cargo capacity. Whether auxiliary fuel tanks are added to increase range or to increase fuel off-load capacity, they should be relatively easy to install and remove so that the aircraft can be quickly changed into the desired configuration.

One known type of auxiliary fuel tank system includes an auxiliary tank installed in a fuselage of an aircraft. The system uses pneumatic pressure to transfer fuel from the auxiliary tank to a center-wing tank of the aircraft. The source of the pneumatic pressure can be cabin air. Alternatively, a supplemental blower system can be used to deliver pneumatic pressure when the cabin air is not sufficient to transfer the fuel. This particular auxiliary fuel tank includes double-wall construction.

Another known type of auxiliary fuel tank system includes a group of three tanks linked together in a fuselage of an aircraft in a cascading fill/empty arrangement. Like the system described above, this system also uses pneumatic pressure to transfer fuel from the auxiliary tanks to a center-wing tank of the aircraft. In this system, however, the separate tanks are filled in sequence with the first tank overflowing into the next and continuing until all the tanks are full. Fuel is transferred out of the tanks in reverse. That is, the last tank empties first and then the next tank until all of the tanks are empty. The first tank in the group to fill is connected to the main fuel system of the aircraft. The last tank in the group to fill is connected to the aircraft vent system and the pressurization source.

A further known type of auxiliary fuel tank system includes a group of three tanks having individual fuel inlet, fuel outlet, and vent manifolds. Each tank includes individual valves to control the inflow and outflow of fuel from the tank. In addition, a single electric motor-driven fuel pump can be installed in each tank for transferring fuel out of the tank. Alternatively, pneumatic pressure from an aircraft bleed air system can be individually provided to each of the tanks for fuel transfer.

Yet another known type of auxiliary fuel tank system includes two or more auxiliary tanks ganged together with slip-together, low-level interconnects that maintain a uniform fuel level across all the tanks. Fuel is added to the tanks via a main fueling manifold of the aircraft. Pneumatic pressure from an aircraft bleed air system is used to flow fuel from the auxiliary tanks into integral aircraft fuel tanks. Venting of the auxiliary tanks is provided via existing aircraft fuel system vents.

A further known type of auxiliary fuel tank system can be found on KC-135 series aircraft. This system uses a number of flexible bladders that are permanently laced into a lower section of the fuselage structure. The bladders include low-level interconnects that allow fuel to migrate from one bladder to the next. An aircraft fueling manifold provides fuel to the bladders for filling. Motor-driven pumps are used to move fuel out of the bladders and return it to the aircraft fuel system or to an aerial refueling system. In this system, the auxiliary tank structure (i.e., the bladder) is single-wall construction.

SUMMARY

The present invention is directed generally toward auxiliary fuel tank systems for aircraft and methods for their manufacture and use. An aircraft configured in accordance with one aspect of the invention includes a fuselage having at least one door, at least one engine configured to provide propulsive thrust, and a fuel system configured to distribute fuel to at least one of the engine and an aerial refueling manifold. The aircraft can further include an auxiliary fuel tank system operably coupled to the fuel system. The auxiliary fuel tank system can include a first tank assembly removably installed in the fuselage, and at least a second tank assembly removably installed in the fuselage at least proximate to the first tank assembly. The first tank assembly can include a first tank body configured to pass through the fuselage door. The second tank assembly can include a second tank body that is at least approximately identical to the first tank body.

In another aspect of the invention, the auxiliary fuel tank system can include a fuel transfer pump operably coupled to a fuel outlet manifold and configured to draw fuel from the first and second tank assemblies. The fuel outlet manifold can include a first fuel inlet positioned in the first tank assembly and a second fuel inlet positioned in the second tank assembly. In a further aspect of the invention, the auxiliary fuel tank system can also include a fuel inlet manifold configured to flow fuel into the first and second tank assemblies via a first fuel outlet positioned in the first tank assembly and a second fuel outlet positioned in the second tank assembly.

A method for increasing the fuel capacity of an aircraft in accordance with one aspect of the invention can include passing a first tank assembly and a second tank assembly through a door in a fuselage of the aircraft. The first tank assembly can have a first tank body and the second tank assembly can have a second tank body that is at least approximately identical to the first tank body. The method can further include operably coupling the second tank assembly to the first tank assembly, and operably coupling the first and second tank assemblies to a fuel system of the aircraft.

In one aspect of this method, operably coupling the first and second tank assemblies to a fuel system of the aircraft can include operably coupling a fuel outlet manifold to the aircraft fuel system. The fuel outlet manifold can include a first inlet positioned in the first tank assembly to provide fuel from the first tank assembly to the aircraft fuel system. The fuel outlet manifold can further include a second inlet positioned in the second tank assembly to provide fuel from the second tank assembly to the aircraft fuel system.

In a further aspect of this method, operably coupling the first and second tank assemblies to a fuel system of the aircraft can include operably coupling a fuel inlet manifold to the aircraft fuel system. The fuel inlet manifold can include a first outlet positioned in the first tank assembly to flow fuel from the aircraft fuel system into the first tank assembly. The fuel inlet manifold can further include a second outlet positioned in the second tank assembly to flow fuel from the aircraft fuel system into the second tank assembly.

DETAILED DESCRIPTION

The following disclosure describes auxiliary fuel tank systems for aircraft and methods for their manufacture and use. Certain details are set forth in the following description and in FIGS. 1-11E to provide a thorough understanding of various embodiments of the invention. Other details describing well-known structures and systems often associated with aircraft and auxiliary fuel tank systems are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
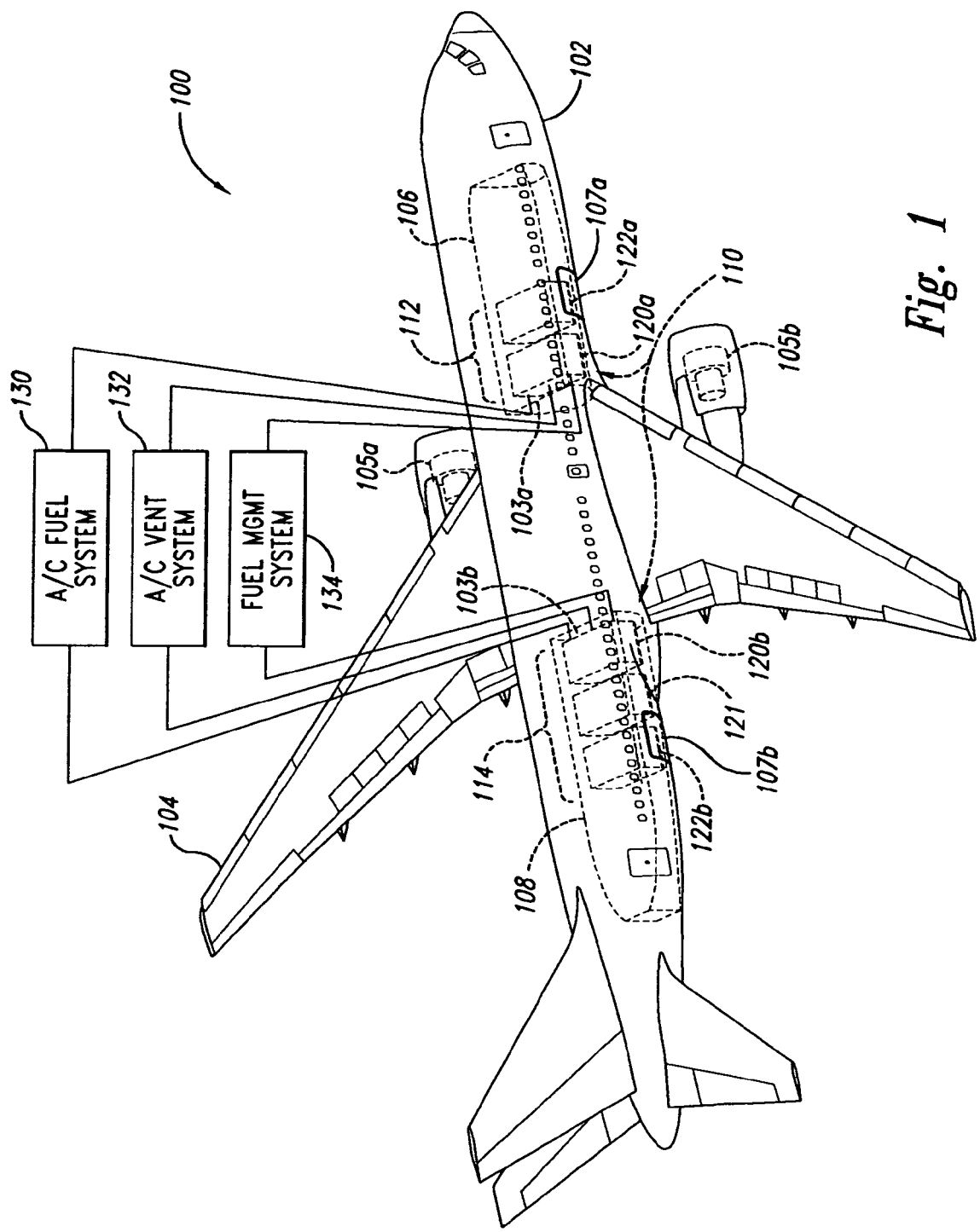
FIG. 1 is a partially schematic, top isometric view of an aircraft with an auxiliary fuel tank system configured in accordance with an embodiment of the invention.

FIG. 1 is a partially schematic, top isometric view of an aircraft 100 having an auxiliary fuel tank system 110 configured in accordance with an embodiment of the invention. The aircraft 100 can include a fuselage 102, a wing 104 extending outwardly from the fuselage 102, and engines 105 (identified individually as a first engine 105a and a second engine 105b) attached to the wing 104 to provide propulsive thrust to the aircraft 100. The fuselage 102 can include a forward cargo compartment 106 having a forward cargo door 107a and an aft cargo compartment 108 having an aft cargo door 107b. In one aspect of this embodiment, the auxiliary fuel tank system 110 includes a forward fuel tank group 112 positioned in the forward cargo compartment 106 and an aft fuel tank group 114 positioned in the aft cargo compartment 108.

As described in greater detail below, both the forward and aft tank groups 112 and 114 can be operably coupled to an aircraft fuel system 130, an aircraft vent system 132, and a fuel management system (FMS) 134 (all shown schematically in FIG. 1). The FMS 134 can receive status information from the auxiliary fuel tank system 110 and transmit this information to a flight controller or a display in the cockpit of the aircraft 100. This information can include, for example, the combined total amount of fuel remaining in all of auxiliary tanks and the individual amounts of fuel remaining in each of the tanks. In addition, as further described in greater detail below, the FMS 134 can also control and monitor auxiliary fuel tank inlet and outlet systems (not shown). The aircraft vent system 132 can maintain the pressure in the auxiliary fuel tank system 110 within an acceptable operating range. The aircraft fuel system 130 can distribute fuel to the auxiliary fuel tank system 110 for filling of the forward tank group 112 and the aft tank group 114 during preflight procedures. In flight, the aircraft fuel system 130 can distribute fuel from the forward tank group 112 and the aft tank group 114 to the engines 105. In addition, the aircraft fuel system 130 can also distribute fuel from the forward tank group 112 and the aft tank group 114 to an aerial refueling system (not shown) if the aircraft 100 includes such a refueling system. Alternatively, the aircraft fuel system 130 can distribute fuel from the aerial refueling system to the forward tank group 112 and the aft tank group 114 if desired.

In another aspect of this embodiment, the forward tank group 112 includes a first master tank assembly 120a and a first end tank assembly 122a. The aft tank group 114 can include a second master tank assembly 120b, a mid tank assembly 121, and a second end tank assembly 122b. In the illustrated embodiment, the mid tank assembly 121 and the end tank assemblies 122 are all "slave" tank assemblies. As described in greater detail below, these tanks are slave tanks because they are filled and drained via equipment positioned in the corresponding "master" tanks 120.

In a further aspect of this embodiment, each of the tank assemblies 120, 121, and 122 is shaped and sized to individually fit through the cargo doors 107 without substantial disassembly. For example, referring to the forward tank group 112, the first master tank assembly 120a is configured to pass through the forward cargo door 107a and be removably positioned proximate to an aft bulkhead 103a in the forward cargo compartment 106. Enough space is provided between the first master tank assembly 120a and the bulkhead 103a so that maintenance personnel can access the interfaces between the forward tank group 112 and the aircraft fuel system 130, the aircraft vent system 132, and the FMS 134. The first end tank assembly 122a is also configured to pass through the forward cargo door 107a, and is further configured to be operably coupled to the first master tank assembly 120a. Referring to the aft tank group 114, the second master tank assembly 120b is configured to pass through the aft cargo door 107b and be positioned proximate to a forward bulkhead 103b in the aft cargo compartment 108. Like the first master tank assembly 120a, the second master tank assembly 120b is spaced apart from the forward bulkhead 103b so that maintenance personnel can access the interfaces between the aft tank group 114 and the aircraft fuel system 130, the aircraft vent system 132, and the FMS 134. The mid tank assembly 121 and the second end tank assembly 122b are also configured to pass through the aft cargo door 107b, and they are further configured to be operably coupled to the second master tank assembly 120b in series.

The number and arrangement of auxiliary fuel tanks positioned in either the forward cargo compartment 106 or the aft cargo compartment 108 can be varied to meet particular range and/or fuel off-load requirements. For example, two auxiliary fuel tanks can be positioned in the forward cargo compartment 106 as illustrated in FIG. 1 by first moving the first master tank assembly 120a through the first cargo door 107a, and then positioning the first master tank 120a proximate to the aft bulkhead 103a. Next, the first end tank assembly 122a can be moved through the forward cargo door 107a and operably coupled to the first master tank assembly 120a. Alternatively, if three auxiliary fuel tanks are needed in the forward cargo compartment 106, then the first end tank assembly 122a can be moved forward in the forward cargo compartment 106 to clear passage for a mid tank assembly (such as the mid tank assembly 121) entering the forward cargo compartment 106 through the forward cargo door 107a. Once the mid tank assembly is in the forward cargo compartment 106, the three auxiliary fuel tanks in the forward cargo compartment 106 can be arranged in series similar to the aft tank group 114. Similar staging sequences can be used to increase or decrease the number of auxiliary fuel tanks installed in either the forward cargo compartment 106 or the aft cargo compartment 108.

In the illustrated embodiment, both the forward tank group 112 and the aft tank group 114 are positioned outside a five-degree rotor burst cone (not shown) of the engines 105 in compliance with applicable regulatory standards. However, the first master tank assembly 120a can be positioned within a broader 15-degree engine rotor burst cone (also not shown). Accordingly, in one aspect of this embodiment, the forward cargo compartment 106 can include shielding if necessary to adequately protect the first master tank assembly 120a from a rotor burst. In addition or as an alternative, the first master tank assembly 120a can include reinforced tank walls to prevent a rupture in the event of a rotor burst. In another embodiment, the proximity of the second master tank assembly 120b to a landing gear system (not shown) of the aircraft 100 may make it susceptible to damage in the event of a landing gear collapse. In such an embodiment, the second master tank assembly 120b can be made smaller than the corresponding slave tank assemblies 121 and 122 to prevent damage to the second master tank assembly 120b in the event of a landing gear collapse.

The auxiliary fuel tank system 110 illustrated in FIG. 1 represents but one possible auxiliary fuel tank arrangement within the scope of the present disclosure. Accordingly, in other embodiments, other numbers of fuel tanks in other arrangements can be used. For example, in one other embodiment, the forward tank group 112 can include only the first master tank assembly 120a and/or the aft tank group 114 can include only the second master tank assembly 120b. In another embodiment, one or more of the master tank assemblies 120 can be the outermost tanks in the respective tank groups, rather than the inner-most as illustrated in FIG. 1. In a further embodiment, the forward tank group 112 can be positioned forward in the forward cargo compartment 106 rather than aft, and/or the aft tank group 114 can be positioned aft in the aft cargo compartment 108 rather than forward.

Figure 2:
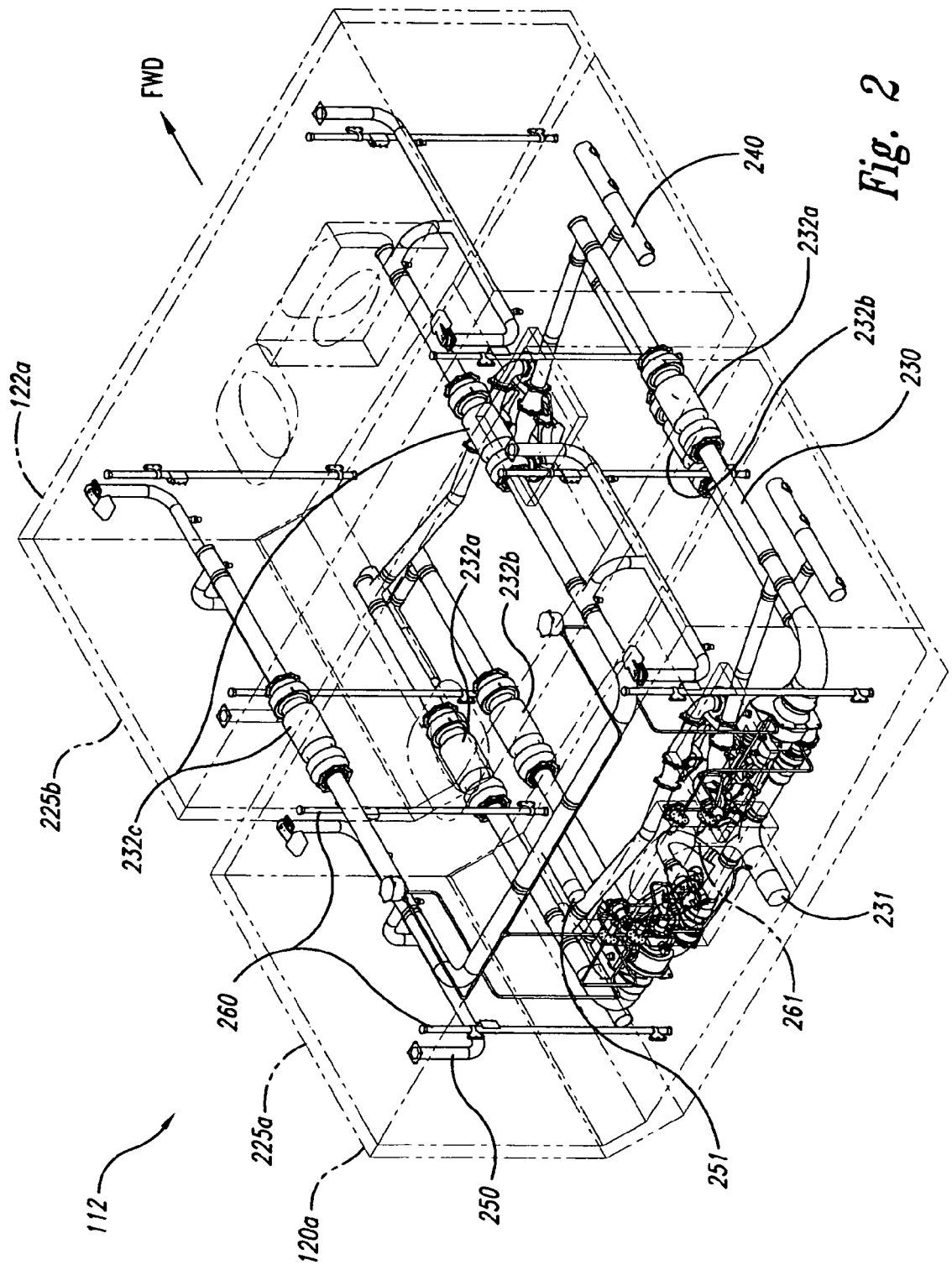
FIG. 2 is an enlarged isometric view of a forward tank group of the auxiliary fuel tank system of FIG. 1 configured in accordance with an embodiment of the invention.

FIG. 2 is an enlarged isometric view of the forward tank group 112 configured in accordance with an embodiment of the invention. In one aspect of this embodiment, the first master tank assembly 120a ("the master tank assembly 120a") includes a first tank body 225a, and the first end tank assembly 122a ("the end tank assembly 122a") includes a second tank body 225b. The tank bodies 225 are the fuel-carrying portions of the corresponding tank assemblies 120 and 122, and are shown in phantom line in FIG. 2 for purposes of clarity. In one embodiment, the first tank body 225a and the second tank body 225b can be at least approximately identical. That is, they can have the same basic structural configuration. As explained in greater detail below, utilizing common tank structures in this manner can significantly reduce manufacturing and assembly costs associated with auxiliary fuel tank systems.

In a further aspect of this embodiment, the forward tank group 112 includes a fuel system interface 231 configured to be operably coupled to the aircraft fuel system 130 (FIG. 1). As described in greater detail below, the fuel system interface 231 serves as a dual purpose fuel inlet/outlet for the forward tank group 112. For example, fuel can flow into the master tank assembly 120a and the end tank assembly 122a from the fuel system interface 231 via a fuel inlet manifold 240. The fuel inlet manifold 240 is configured so that both of the tank assemblies can be filled at approximately the same time, i.e., at least approximately simultaneously. Conversely, fuel can flow out of the master tank assembly 120a and the end tank assembly 122a through the fuel system interface 231 via a fuel outlet manifold 230. The fuel outlet manifold 230 is configured so that both of the tank assemblies can be drained at approximately the same time, i.e., at least approximately simultaneously.

The fuel outlet manifold 230 extends into both the master tank assembly 120a and the end tank assembly 122a, and is coupled together by a first tank interconnect 232a bridging the gap between the two fuel tanks. Similarly, the fuel inlet manifold 240 extends into both the master tank assembly 120a and the end tank assembly 122a, and is coupled together by a second tank interconnect 232b. The tank interconnects 232 can provide sealed interfaces between adjacent fuel tanks and corresponding sections of the fuel outlet manifold 230. In one embodiment, they can have double-wall construction and can include telescoping and gimbaling features that accommodate relative misalignment or motion between the fuel tanks.

In yet another aspect of this embodiment, the forward tank group 112 includes a vent system interface 251 configured to be operably connected to the aircraft vent system 132 (FIG. 1). As described in greater detail below, the vent system interface 251 provides venting of the master tank assembly 120a and the end tank assembly 122a via a vent manifold 250. The vent manifold 250 extends into both the master tank assembly 120a and the end tank assembly 122a, and is coupled together by a third tank interconnect 232c.

In a further aspect of this embodiment, the forward tank group 112 includes an FMS interface 261 configured to be operably coupled to the FMS 134 (FIG. 1). As described in greater detail below, the FMS interface 261 can transmit various fuel tank status information from the forward tank group 112 to the FMS 134 for use by a pilot or a flight computer. Such information can include, for example, usable fuel remaining in the forward tank group 112 as measured by a fuel gauging system 260.

Figure 3:
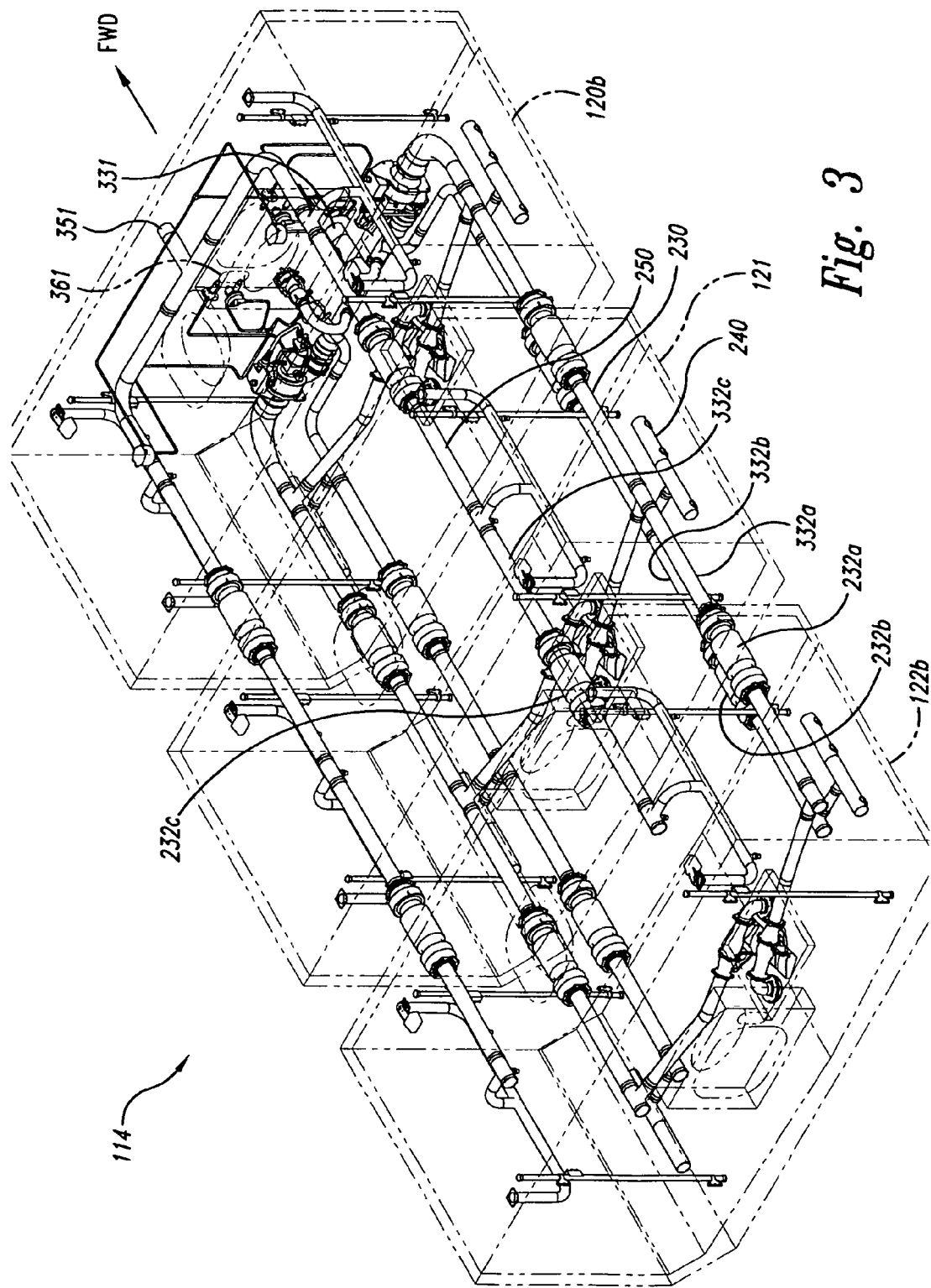
FIG. 3 is an enlarged isometric view of an aft tank group of the auxiliary fuel tank system of FIG. 1 configured in accordance with an embodiment of the invention.

FIG. 3 is an enlarged isometric view of the aft tank group 114 configured in accordance with an embodiment of the invention. In one aspect of this embodiment, many portions of the aft tank group 114 are at least generally similar in structure and function to corresponding portions of the forward tank group 112 described above with reference to FIG. 2. For example, the second master tank assembly 120b can be at least generally similar in structure and function to the first master tank assembly 120a. Accordingly, the second master tank assembly 120b can include an aircraft fuel system interface 331, an aircraft vent system interface 351, and an FMS interface 361 that are at least generally similar in structure and function to the corresponding portions of the first master tank assembly 120a. Similarly, the second end tank assembly 122b ("the end tank assembly 122b") can be at least generally similar in structure and function to the first end tank assembly 122a. One clear difference between the forward tank group 112 of FIG. 2 and the aft tank group 114, however, is the addition of the mid tank assembly 121.

In a further aspect of this embodiment, many portions of the mid tank assembly 121 are at least generally similar in structure and function to corresponding portions of the end tank assembly 122b. One difference between these two tank assemblies, however, is that a number of extensions can be added to the vent and fuel system manifolds in the mid tank assembly 121 to extend the manifolds for coupling to the end tank assembly 122b. For example, outlet manifold extensions 332a can be added to the fuel outlet manifold 230, and inlet manifold extensions 332b can be added to the fuel inlet manifold 240. Similarly, vent manifold extensions 332c can be added to the vent manifold 250. In addition to the manifold extensions 332, additional tank interconnects 232 are also required to operably couple the mid tank assembly 121 to the end tank assembly 122b.

One feature of embodiments described above and illustrated in FIGS. 1-3 is that both of the tanks in the forward tank group 112 (FIG. 1) can be filled and/or drained at least approximately simultaneously, and all three of the tanks in the aft tank group 114 can be filled and/or drained at least approximately simultaneously. One advantage of this feature over other tank systems that fill and drain in a cascading manner is that it can enable the auxiliary fuel tank system 110 (FIG. 1) to maintain a more consistent center of gravity location as the fuel tanks are being filled and drained. Another advantage of this feature is that it can enable the forward tank group 112 and the aft tank group 114 to be filled and/or drained at a higher rate than comparably sized tanks that fill and drain in a cascading manner.

Figure 4:
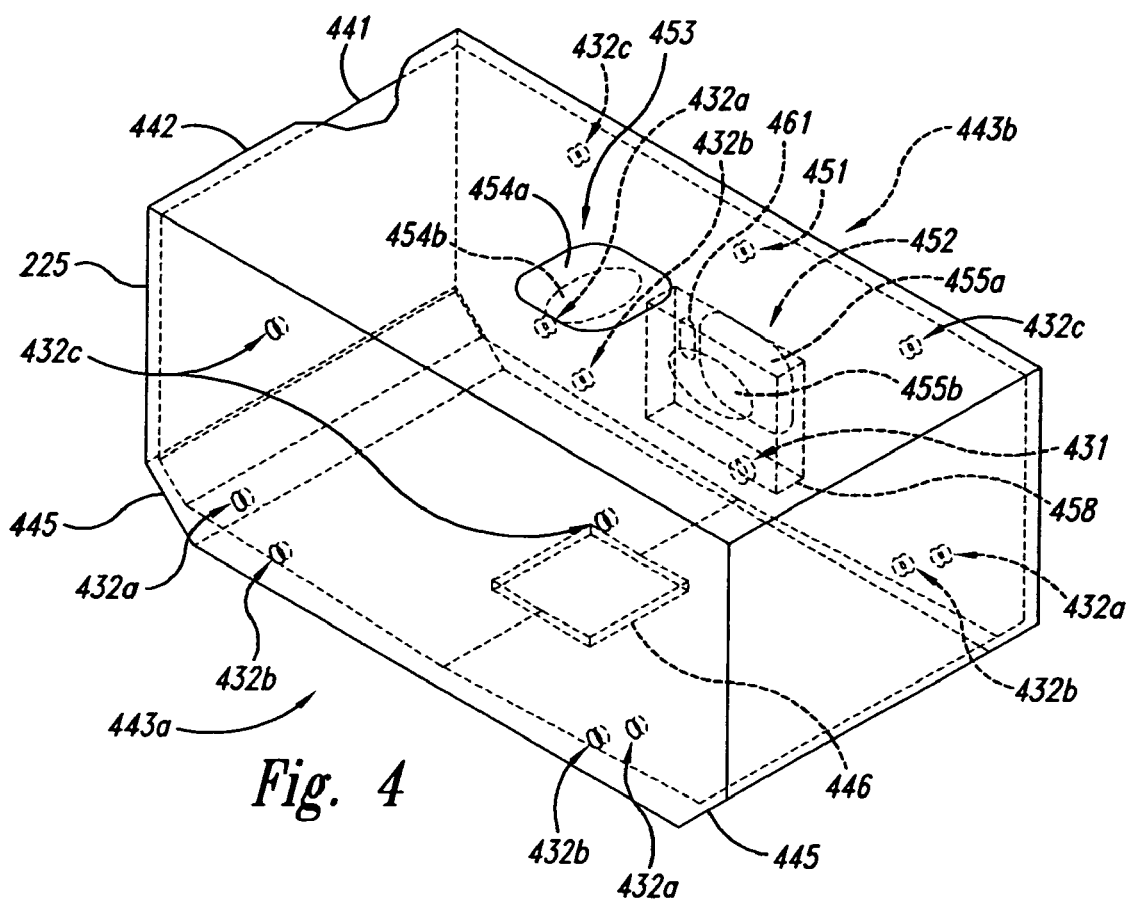
FIG. 4 is an enlarged isometric view of a tank body configured in accordance with an embodiment of the invention.

FIG. 4 is an enlarged, isometric view of the tank body 225 configured in accordance with an embodiment of the invention. In one aspect of this embodiment, the tank body 225 is of double-wall construction and includes an outer tank skin 442 and an inner tank skin 441. The inner skin 441 can act as a fuel-carrying membrane that can be configured to carry at least about 250 gallons of fuel. For example, in one transport aircraft embodiment, the tank body 225 can be configured to carry at least about 750 gallons of fuel. In another such embodiment, the tank body 225 can be configured to carry at least about 1000 gallons of fuel. In other embodiments, the tank body 225 can be configured to carry more or less fuel, depending on the particular needs of the aircraft and on any limiting physical dimensions of the aircraft. Such limiting physical dimensions can include, for example, cargo compartment dimensions and door opening dimensions. The outer skin 442 can provide a redundant fuel barrier to safeguard against leaks and protect the inner skin 441 from external damage.

In another aspect of this embodiment, the tank body 225 includes a top access port 453 and a side access port 452. The top access port 453 can include an outer top door 454a and an inner top door 454b. The outer top door 454a can removably cover a corresponding aperture in the outer tank skin 442. The inner top door 454b can be positioned directly below the outer top door 454a, and can removably cover a corresponding aperture in the inner tank skin 441. Removal of the top doors 454 can provide access to the interior of the tank body 225 for inspection or maintenance of one or more of the systems installed within as described in greater detail below.

The side access port 452 can include an outer side door 455a and an inner side door 455b. The outer side door 455a can removably cover a corresponding aperture in the outer tank skin 442. Removal of the outer side door 455a can provide access to a dry bay 458 extending between the outer tank skin 442 and the inner tank skin 441. As described in greater detail below, a number of fuel tank interface controls can be housed in the dry bay 458 so that they can be easily accessed by maintenance personnel if needed when the tank body 225 is full of fuel. The inner side door 455b can be positioned directly inboard of the outer side door 455a, and can removably cover a corresponding aperture in the inner tank skin 441. Removal of the inner side door 455b can provide additional access to the interior of the tank body 225. In a further aspect of this embodiment, the inner tank skin 441 forms a fuel sump 446 extending downwardly from the bottom of the tank body 225. As further described in detail below, use of the fuel sump 446 helps to reduce the amount of fuel remaining in the tank body 225 after draining.

In yet another aspect of this embodiment, the tank body 225 includes a first end wall 443a and an opposite second end wall 443b. In the illustrated embodiment, the end walls 443 have profiles that maximize the available cross-sectional space in the aircraft cargo compartment. Accordingly, in this embodiment, the end walls 443 include beveled corner portions 445 toward the bottom of the tank body 225 that follow the contour of the cargo compartment. As mentioned above, in other embodiments, the tank body 225 can be made smaller and/or narrower to prevent damage during a landing gear collapse. In such embodiments, the beveled corner portions 445 are not required and the end walls 443 can accordingly be rectangular in shape.

In a further aspect of this embodiment, the first end wall 443a includes two fuel outlet apertures 432a, two fuel inlet apertures 432b, and two vent apertures 432c. These apertures are configured to accommodate passage of the fuel outlet manifold 230, the fuel inlet manifold 240, and the vent manifold 250, respectively, described above with reference to FIGS. 2 and 3. The second end wall 443b can include the same complement of apertures described above for the first end wall 443a. In addition, however, the second end wall 432b can further include a fuel system aperture 431, a vent system aperture 451, and an FMS aperture 461. As described above with reference to FIG. 2, these apertures are configured to accommodate passage of corresponding aircraft interfaces (i.e., the fuel system interface 231, the vent system interface 251, and the FMS interface 261 shown in FIG. 2).

One feature of the embodiment described above and illustrated in FIG. 4 is that the apertures 432 are common to both the first end wall 443a and the second end wall 443b. As described in greater detail below, one advantage of this feature is that a single tank body configuration (i.e., the tank body 225) can be used to construct the master tank assembly 120, the mid tank assembly 121, or the end tank assembly 122. If some of the end wall apertures are not used for a particular tank configuration, those apertures can be sealed with a suitable cover.

Figure 5:
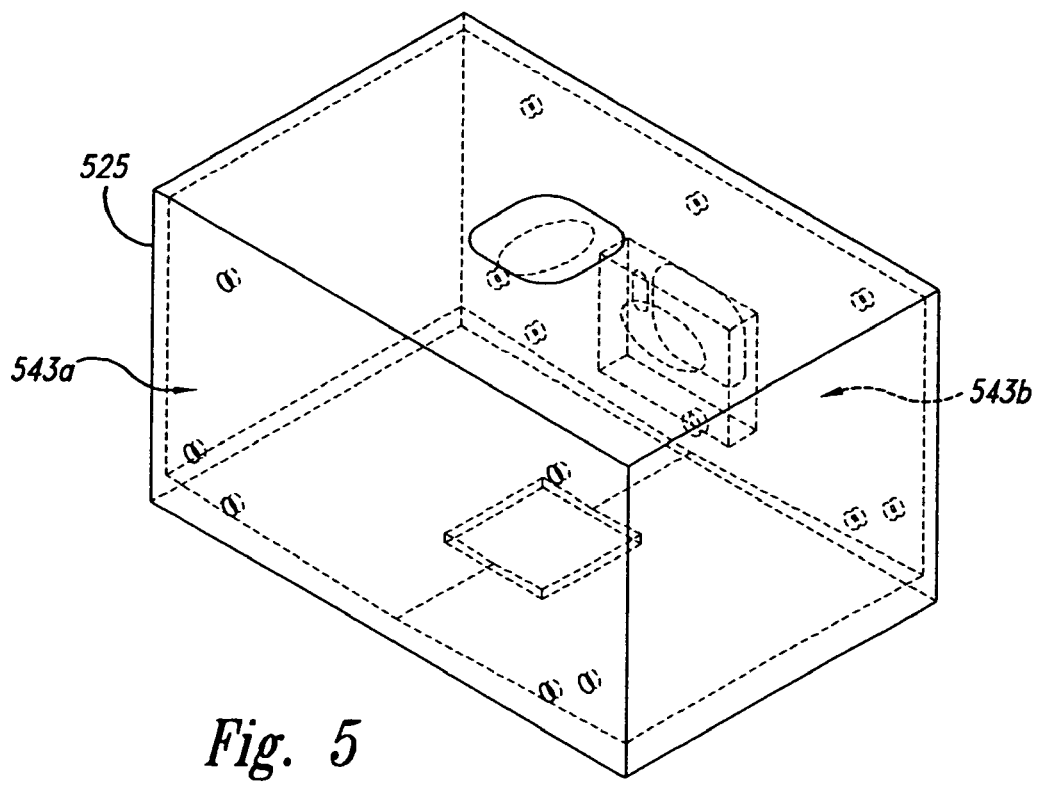
FIG. 5 is an enlarged isometric view of a tank body configured in accordance with another embodiment of the invention.

FIG. 5 is an enlarged isometric view of a tank body 525 configured in accordance with another embodiment of the invention. Many aspects of the tank body 525 can be at least generally similar in structure and function to the tank body 225 describe above with reference to FIG. 4. In one particular aspect of this embodiment, however, the tank body 525 includes a first end wall 543a and an opposite second end wall 543b that are at least generally rectangular in shape and smaller than the corresponding end walls 443 of the tank body 225. As described above, in one embodiment, the smaller tank body 525 can be used for a master or slave tank assembly when the tank assembly is installed in a position that could be susceptible to damage from landing gear collapse.

Figure 6:
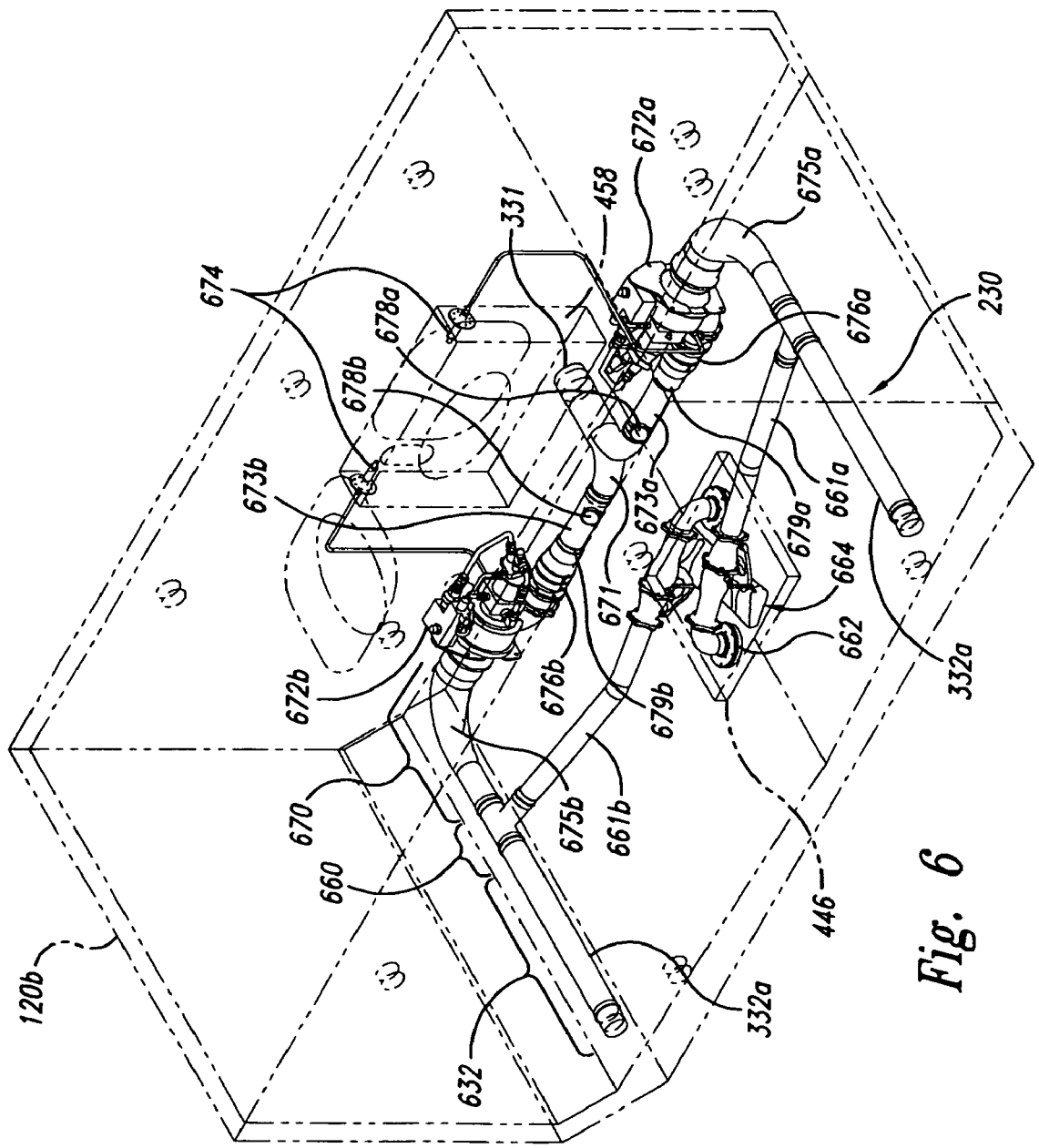
FIG. 6 is an enlarged isometric view of a master tank assembly of FIG. 3 illustrating features of a fuel outlet manifold configured in accordance with an embodiment of the invention.

FIG. 6 is an enlarged isometric view of the second master tank assembly 120b ("the master tank assembly 120b") of FIG. 3 illustrating features of the fuel outlet manifold 230 configured in accordance with an embodiment of the invention. Selected internal components of the master tank assembly 120b, such as the fuel inlet manifold 240, the vent manifold 250, and the fuel gauging system 260, have been omitted from FIG. 6 for purposes of clarity. In one aspect of this embodiment, the fuel outlet manifold 230 includes a master tank portion 670 that is unique to the master tank assembly 120b, a basic tank portion 660 that is common to all master and slave tank assemblies, and an extension portion 632 that interconnects the basic tank portion 660 to other basic tank portions 660 positioned in adjacent tank assemblies.

In another aspect of this embodiment, the master tank portion 670 of the fuel outlet manifold 230 is operably coupled to a dual-purpose fuel inlet/outlet manifold 671. The fuel inlet/outlet manifold 671 includes the aircraft fuel system interface 331, and bifurcates into a first branch 673a and a corresponding second branch 673b. Each branch 673 of the fuel inlet/outlet manifold 671 can include an inlet manifold interface 678 (identified individually as a first inlet manifold interface 678a and a second inlet manifold interface 678b). As described below in reference to FIG. 8, the inlet manifold interfaces 678 are configured to be operably coupled to corresponding branches of the inlet manifold 240 (not shown).

In a further aspect of this embodiment, each branch 673 of the fuel inlet/outlet manifold 671 also includes an outlet manifold interface 679 (identified individually as a first outlet manifold interface 679a and a second outlet manifold interface 679b). The first outlet manifold interface 679a can be operably coupled to a corresponding first branch 675a of the master tank portion 670. Similarly, the second outlet manifold interface 679b can be operably coupled to a corresponding second branch 675b of the master tank portion 670. Each branch 675 of the master tank portion 670 can include a pump outlet check valve 676 (identified individually as a first pump outlet check valve 676a and a second pump outlet check valve 676b) operably coupled in series to a fuel transfer pump 672 (identified individually as a first fuel transfer pump 672a and a second fuel transfer pump 672b). Because they are positioned within the inner tank volume of the master tank assembly 120b and exposed to fuel, the fuel transfer pumps 672 of the illustrated embodiment can be hydraulically driven. In other embodiments, such as embodiments in which the fuel transfer pumps 672 are positioned within a dry bay 458 of the master tank assembly 120b, the fuel transfer pumps 672 can be electrically driven.

In yet another aspect of this embodiment, a pump pressure switch 674 is operably coupled to each of the fuel transfer pumps 672 and is accessibly mounted in the dry bay 458. The pump pressure switches 674 can be operably connected to the FMS 134 (FIG. 1) through a control and monitoring interface (not shown), and can provide a corresponding signal when the fuel transfer pumps 672 are operating. Placing the pump pressure switches 674 in an accessible portion of the dry bay 458 enables them to be inspected or replaced without entering the interior portion of the master tank assembly 120b.

In a further aspect of this embodiment, the basic tank portion 660 of the fuel outlet manifold 230 includes a first fuel inlet duct 661a operably coupled to the first branch 675a of the master tank portion 670 and a second fuel inlet duct 661b operably coupled to the second branch 675b of the master tank portion 670. Each of the fuel inlet ducts 661 can include a corresponding fuel inlet 662 positioned at least generally within the fuel sump 446. As described in greater detail below, in a further aspect of this embodiment, each fuel inlet 662 can include a corresponding shutoff valve assembly 664 configured to close the corresponding fuel inlet 662 before the fuel inlet 662 loses prime, that is, before the fuel level in the tank falls below the fuel inlet 662. Closing the fuel inlet 662 while it is still submerged in fuel can prevent the fuel outlet manifold 230 from ingesting air. This can minimize loss of pump prime when any one of two or more tanks in a tank group empties before one or more of the other tanks in the group. Accordingly, when fuel is no longer available in one of the tanks, the corresponding fuel inlets 662 close to isolate the tank from the others in the group.

In a further aspect of this embodiment, the extension portion 632 of the fuel outlet manifold 230 includes two outlet manifold extensions 332a. Each of the outlet manifold extensions 332a can be operably coupled to a corresponding one of the fuel inlet ducts 661. As described above with reference to FIG. 3, the outlet manifold extensions 332a can extend the fuel outlet manifold 230 into an adjacent fuel tank assembly, such as the mid tank assembly 121 or an end tank assembly 122 (FIGS. 2 and 3).

When fuel is being flowed into the master tank assembly 120b through the fuel system interface 331, the pump outlet check valves 676 on the outlet manifold 230 are closed causing the fuel to flow into the inlet manifold 240 (FIGS. 2 and 3) via the inlet manifold interfaces 678. Conversely, when it is desired to draw fuel from the master tank assembly 120b, the pump outlet check valves 676 are opened and the fuel transfer pumps 672 pump fuel out of the master tank assembly 120b via the fuel inlet ducts 661. Concurrently, the fuel transfer pumps 672 are also pumping fuel out of any adjoining tanks (e.g., the mid tank assembly 121 and the end tank assembly 122 of FIG. 3) via the outlet manifold extensions 332a. As fuel is being pumped out of the master tank assembly 120b through the fuel inlet/outlet manifold 671, shutoff valves on the fuel inlet manifold 240 (not shown) are accordingly closed to prevent the fuel from back-flowing into the tanks via the inlet manifold 240.

Figure 7A:
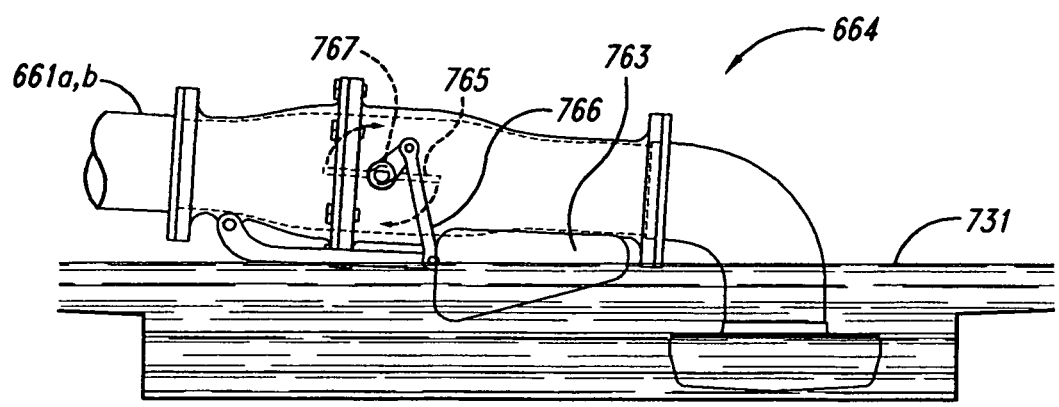
FIGS. 7A-7B are enlarged, partially hidden side elevation views of a shut-off valve assembly of the fuel outlet manifold of FIG. 6, configured in accordance with an embodiment of the invention.
Figure 7B:
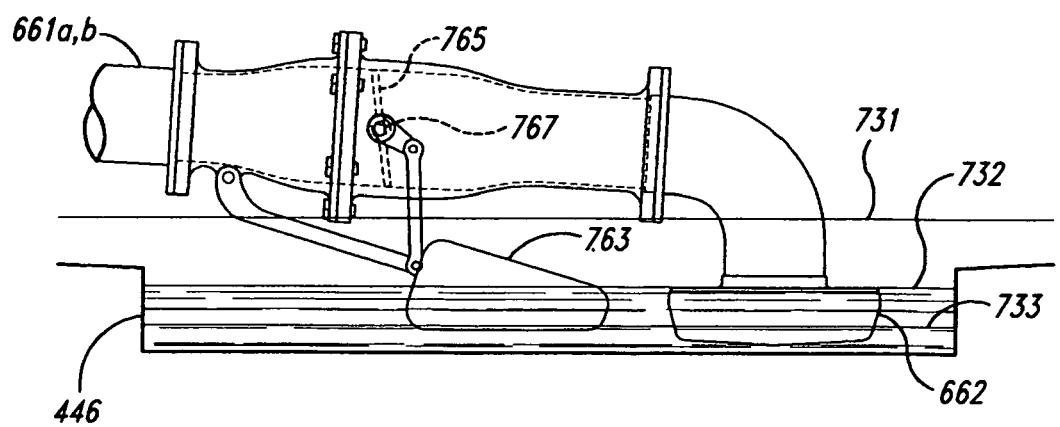

FIGS. 7A-7B are enlarged, partially hidden side elevation views of the shutoff valve assembly 664 of FIG. 6 configured in accordance with an embodiment of the invention. Referring first to FIG. 7A, in one aspect of this embodiment, the shutoff valve assembly 664 includes a float 763 operably coupled to a valve 765 via a linkage 766. The valve 765 can be positioned inside the fuel inlet duct 661, and can be a butterfly type configured to rotate about a shaft 767 as the position of the float 763 changes. When fuel in the tank is at or above a first fuel level 731, the float 763 maintains the valve 765 in a fully open position as shown in FIG. 7A.

Referring next to FIG. 7B, as the fuel level drops from the first fuel level 731 toward a second fuel level 732, the float 763 moves downwardly causing the valve 765 to begin rotating about the shaft 767 toward a closed position. When the fuel level reaches the second fuel level 732, the valve 765 is at least approximately fully closed as shown in FIG. 7B. At this point, the fuel inlet 662 is still submerged, thereby preventing the fuel inlet duct 661 from ingesting air or other gaseous substances occupying the space in the fuel tank above the fuel. Even if the fuel level drops to a third fuel level 733, the fuel inlet 662 will still be submerged. Accordingly, the distance between the second fuel level 732 and the third fuel level 733 corresponds to a buffer between a closed valve position and an uncovered inlet position. In a further aspect of this embodiment, by positioning the fuel inlet 662 and the corresponding shutoff valve assembly 664 in the fuel sump 446, the amount of fuel remaining in the tank after draining is minimized.

The shutoff valve assembly 664 is but one type of mechanical shutoff valve that can be used with the fuel outlet manifold 230 to avoid losing prime on one or more of the fuel transfer pumps 672. In other embodiments, other types of shutoff valves can be used. For example, in one other embodiment, an electrically actuated valve can be used. In a further embodiment, a hydraulically actuated valve can be used. In still further embodiments, the shutoff valve assembly 664 can be omitted and, instead, a fuel level sensor can be used to command a valve, such as an electrically actuated valve, to close the corresponding fuel inlet before the fuel level drops below the inlet.

Figure 8:
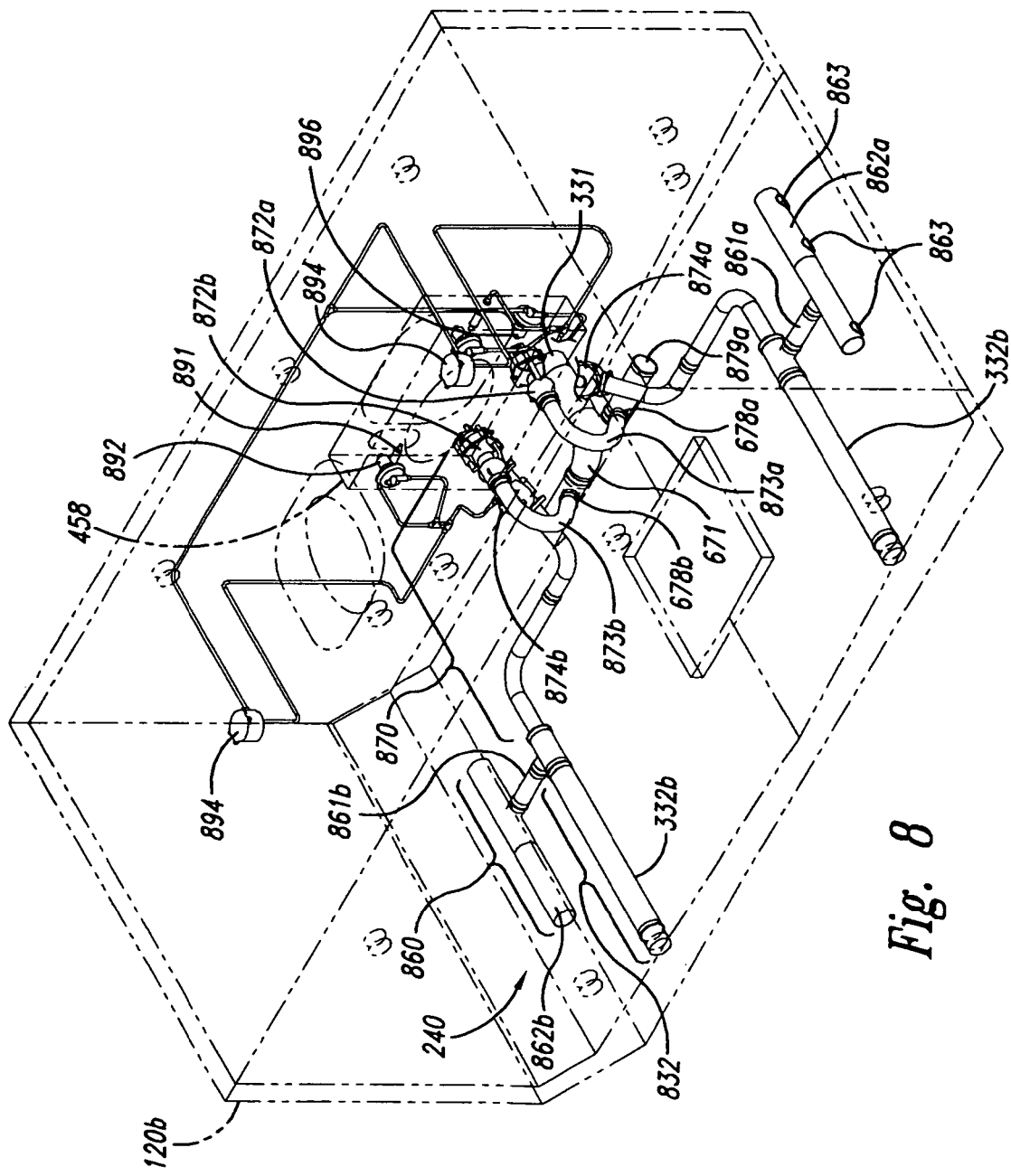
FIG. 8 is an enlarged isometric view of the master tank assembly of FIG. 3 illustrating features of a fuel inlet manifold configured in accordance with an embodiment of the invention.

FIG. 8 is an enlarged isometric view of the master tank assembly 120b of FIG. 3 illustrating features of the fuel inlet manifold 240 configured in accordance with an embodiment of the invention. Selected internal components of the master tank assembly 120b, such as the vent manifold 250 and the fuel gauging system 260, have been omitted from FIG. 8 for purposes of clarity. In addition, the fuel outlet manifold 230 of FIG. 6 (which is normally coupled to the fuel inlet/outlet manifold 671 at the outlet manifold interfaces 679) is also not shown in FIG. 8 for purposes of clarity. In one aspect of this embodiment, the fuel inlet manifold 240 includes a master tank portion 870 that is unique to the master tank assembly 120b, a basic tank portion 860 that is common to all master and slave tank assemblies, and an extension portion 832 that interconnects the basic tank portion 860 to other basic tank portions 860 positioned in adjoining tank assemblies.

In another aspect of this embodiment, the master tank portion 870 of the fuel inlet manifold 240 includes a first branch 873a operably coupled to the fuel inlet/outlet manifold 671 at the first inlet manifold interface 678a and a second branch 873b operably coupled to the fuel inlet/outlet manifold 671 at the second inlet manifold interface 678b. Each branch 873 of the master tank portion 870 can include a primary fueling valve 872 (identified individually as a first primary fueling valve 872a and a second primary fueling valve 872b) operably coupled in series to a secondary fueling valve 874 (identified individually as a first secondary fueling valve 874a and a second secondary fueling valve 874b). In addition, each branch 873 of the fuel inlet manifold 240 can also include a refuel shutoff pressure switch 891 and a ground fueling solenoid valve 892 positioned in the dry bay 458. The refuel shutoff pressure switch 891 and the ground fueling solenoid valve 892 can be operably coupled between the secondary fueling valve 874 and a corresponding pilot float valve 894. The pilot float valve 894 is configured to command the secondary fueling valve 874 closed when the fuel in the tank rises above the pilot float valve 894, thereby stopping the flow of fuel into the master tank assembly 120b. If desired, the ground fueling solenoid valve 892 can be used to override the pilot float valve 894 and increase the fuel level in the master tank assembly 120b above that normally allowed by the pilot fuel valve 894. The refuel shutoff pressure switch 891 can be configured to send a signal to the FMS 134 (FIG. 1) corresponding to the position of the secondary fueling valve 874, that is, corresponding to whether the secondary fueling valve 874 is open or closed.

In a further aspect of this embodiment, the master tank portion 870 of the fuel inlet manifold 240 can also include a solenoid pre-check valve 896 positioned within the dry bay 458. The solenoid pre-check valve 896 can be operably coupled to both of the pilot float valves 894. The solenoid pre-check valve 896 can provide a means for verifying that the pilot float valves 894 are functioning properly. For example, in one embodiment, the solenoid pre-check valves 896 can be commanded through the FMS 134 (FIG. 1) to rapidly fill the pilot float valves 894 with fuel to verify that they cause the secondary fueling valves 874 to close properly. The FMS 134 can control the primary fueling valves 872, the solenoid pre-check valves 896, the ground fueling solenoid valves 892, and the shutoff pressure switch 891 through the FMS interface 261 described above with reference to FIG. 2.

In yet another aspect of this embodiment, the basic tank portion 860 of the fuel inlet manifold 240 includes a first fuel outlet duct 861a operably coupled to the first branch 873a of the master tank portion 870 and a second fuel outlet duct 861b operably coupled to the second branch 873b of the master tank portion 870. In the illustrated embodiment, each of the fuel outlet ducts 861 includes a piccolo tube 862 (identified individually as a first picollo tube 862a and a second picollo tube 862b) having a plurality of fuel outlets 863. The fuel outlets 863 distribute incoming fuel into the interior of the master tank assembly 120b.

In a further aspect of this embodiment, the extension portion 832 of the fuel inlet manifold 240 includes two inlet manifold extensions 332b. Each of the inlet manifold extensions 332b can be operably coupled to a corresponding one of the fuel outlet ducts 861. As described above with reference to FIG. 3, the inlet manifold extensions 332b can extend the fuel inlet manifold 240 into an adjoining fuel tank assembly, such as the mid tank assembly 121 or an end tank assembly 122 (FIGS. 2 and 3).

To fill the master tank 120b and any corresponding slave tanks (not shown) with fuel, the primary and secondary fueling valves 872 and 874 are opened and fuel is introduced into the fuel inlet/outlet manifold 671 via the fuel system interface 331. From the inlet/outlet manifold 671, the fuel flows past the opened primary fueling valves 872 and the opened secondary fueling valves 874 to the fuel outlet ducts 861. From there, the fuel flows into the master tank assembly 120b from the corresponding piccolo tubes 862. Concurrently, the fuel also flows to any adjoining tanks (e.g., the mid tank assembly 121 and the end tank assembly 122 of FIG. 3) via the inlet manifold extensions 332b. As fuel is being flowed into the master tank assembly 120b through the fuel inlet/outlet manifold 671, the pump outlet check valves 676 (FIG. 6) on the fuel outlet manifold 230 are accordingly closed to prevent the fuel from back-flowing into the fuel transfer pumps 672 (also FIG. 6).

Figure 9:
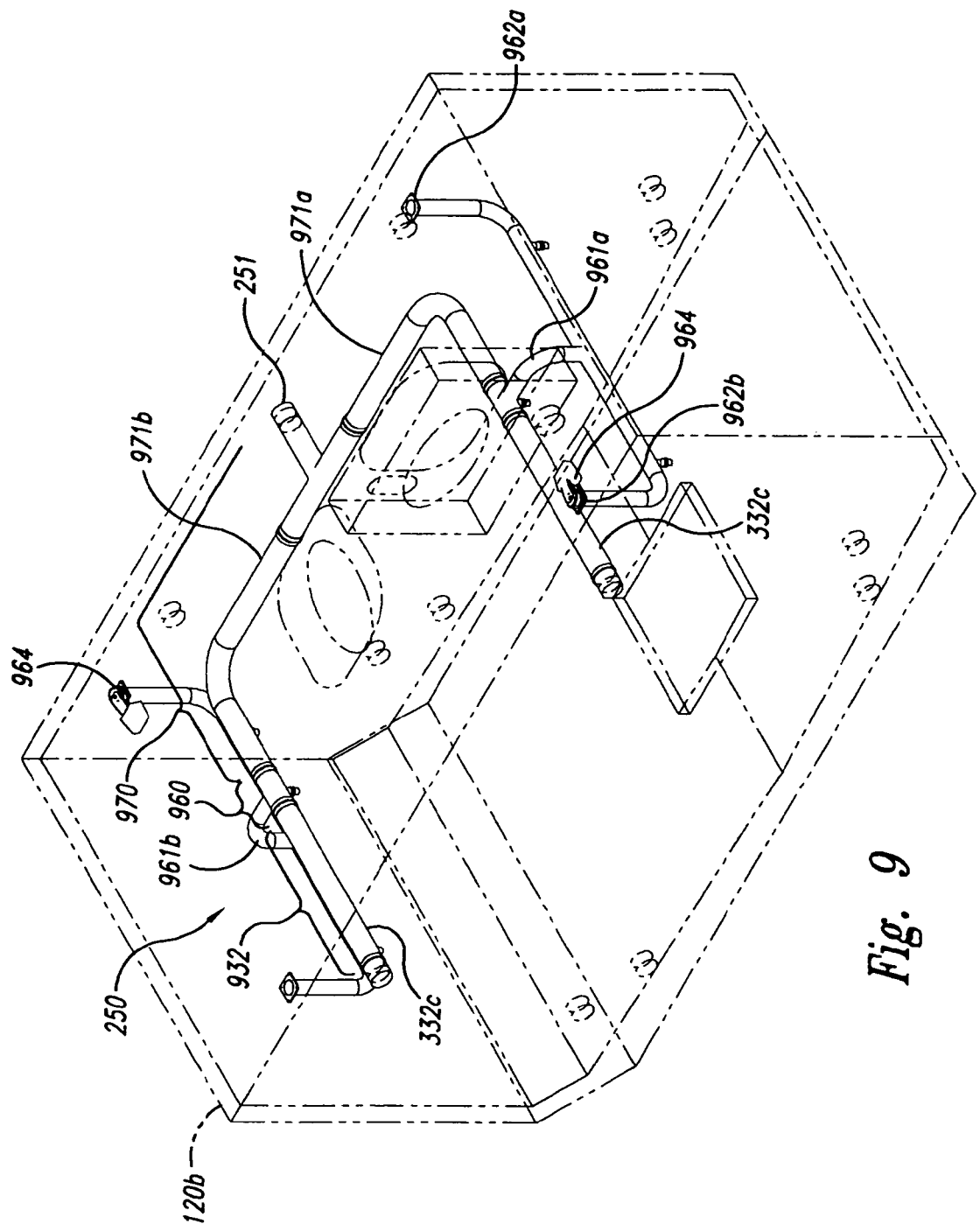
FIG. 9 is an enlarged isometric view of the master tank assembly of FIG. 3 illustrating features of a vent manifold configured in accordance with an embodiment of the invention.

FIG. 9 is an enlarged isometric view of the master tank assembly 120b of FIG. 3 illustrating features of the vent manifold 250 configured in accordance with an embodiment of the invention. Selected internal components of the master tank assembly 120b, such as the fuel inlet manifold 240, the fuel outlet manifold 230, and the fuel gauging system 260 have been omitted from FIG. 9 for purposes of clarity. In one aspect of this embodiment, the vent manifold 250 includes a master tank portion 970 that is unique to the master tank assembly 120b, a basic tank portion 960 that is common to all master and slave tank assemblies, and an extension portion 932 that interconnects the basic tank portion 960 to other basic tank portions 960 positioned in adjoining tank assemblies.

In another aspect of this embodiment, the master tank portion 970 of the vent manifold 250 includes a first branch 971a and a second branch 971b extending outwardly from the vent system interface 251. The basic tank portion 960 of the vent manifold 250 can include a first vent duct 961a operably coupled to the first branch 971a and a second vent duct 961b operably coupled to the second branch 971b. The extension portion 932 of the vent manifold 250 can include two vent manifold extensions 332c. Each of the vent manifold extensions 332c can be operably coupled to a corresponding one of the vent ducts 961. As described above with reference to FIG. 3, the vent manifold extensions 332c can extend the vent manifold 250 into an adjoining fuel tank assembly, such as the mid tank assembly 121 or an end tank assembly 122 (FIGS. 2 and 3).

In a further aspect of this embodiment, each of the vent ducts 961 includes a first vent port 962a and a second vent port 962b. In the illustrated embodiment, the first vent port 962a remains open at all times, but the second vent port 962b includes a vent float valve 964 configured to close the second vent port 962b if the fuel level rises above the second vent port 962b. The arrangement of the vent float valves 964 can minimize the amount of fuel flowing into the vent manifold 250 as the fuel sloshes around in the master tank assembly 120b.

Figure 10:
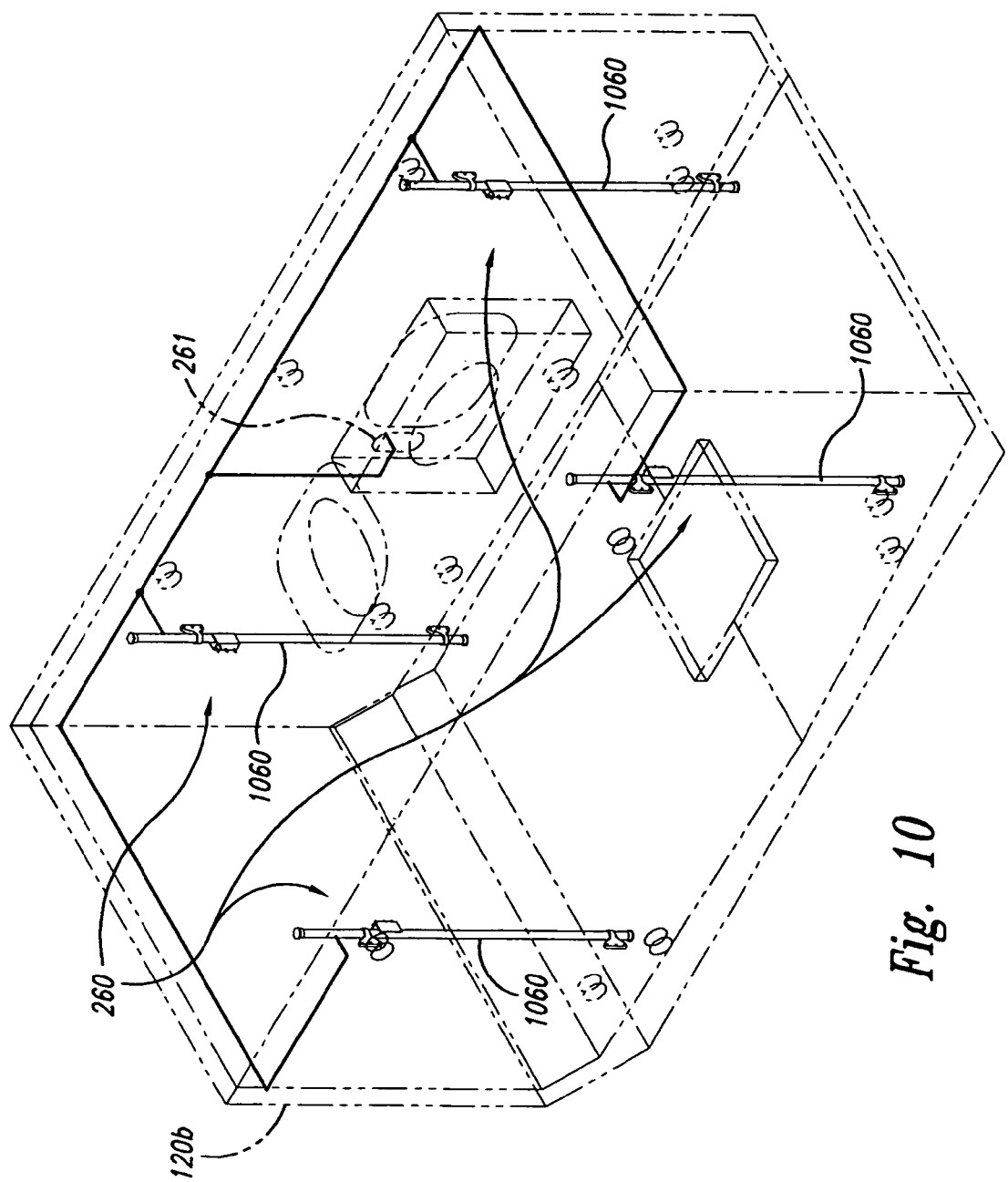
FIG. 10 is an enlarged isometric view of the master tank assembly of FIG. 3 illustrating features of a fuel gauging system configured in accordance with an embodiment of the invention.

FIG. 10 is an enlarged isometric view of the master tank assembly 120b of FIG. 3 illustrating features of the fuel gauging system 260 configured in accordance with an embodiment of the invention. Selected internal components of the master tank assembly 120b, such as the fuel inlet manifold 240, the fuel outlet manifold 230, and the vent manifold 250 have been omitted from FIG. 10 for purposes of clarity. In one aspect of this embodiment, the fuel gauging system 260 includes four fuel probes or fuel gauges 1060 mounted toward respective corners of the master tank assembly 120b. The plurality of fuel gauges 1060 can be operably connected to the FMS interface 261 to provide fuel volume information to the aircraft FMS 134 (FIG. 1).

Figure 11A:
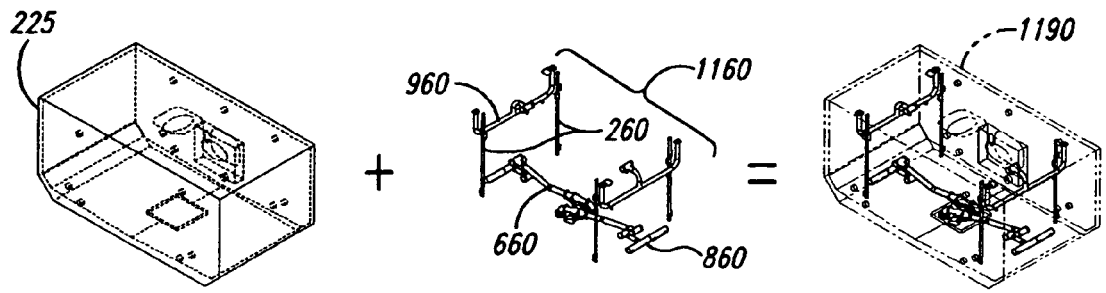
FIGS. 11A-11E are schematic diagrams illustrating modular features of the present invention that enable multiple tank configurations to be assembled from a common set of components in accordance with an embodiment of the invention.
Figure 11B:
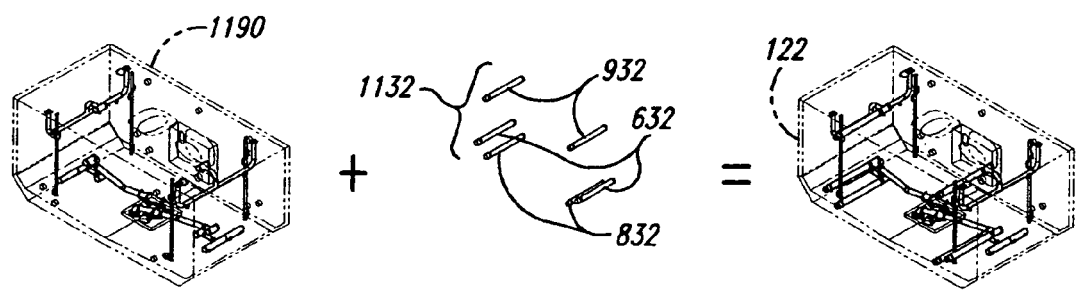

FIGS. 11A-11E are schematic diagrams illustrating modular features of the present invention that enable at least three different tank configurations to be assembled from the same basic set of components. Referring first to FIG. 11A, a tank assembly sequence in accordance with one embodiment of the invention can begin with the basic tank body 225 described above with reference to FIG. 4. Basic tank systems 1160 can be added to the tank body 225 to produce a basic tank assembly 1190. The basic tank systems 1160 can include the basic tank portion 660 of the fuel outlet manifold 230 (FIG. 6), the basic tank portion 860 of the fuel inlet manifold 240 (FIG. 8), the basic tank portion 960 of the vent manifold 250 (FIG. 9), and the fuel gauging system 260 (FIG. 10).

Figure 11C:
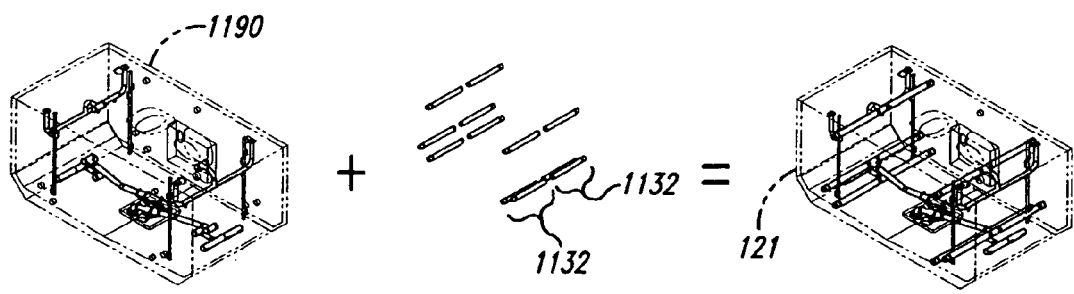

The basic tank assembly 1190 of FIG. 11A can form the basis of a number of different tank configurations. For example, referring to FIG. 11B, in one embodiment, manifold extension systems 1132 can be added to the basic tank assembly 1190 to produce the end tank assembly 122 described above with reference to FIGS. 1-3. The manifold extension systems 1132 can include the extension portion 632 of the fuel outlet manifold 230 (FIG. 6), the extension portion 832 of the fuel inlet manifold 240 (FIG. 8), and the extension portion 932 of the vent manifold 250 (FIG. 9). Referring next to FIG. 11C, in another embodiment, two sets of the manifold extension systems 1132 can be added to the basic tank assembly 1190 to produce the mid tank assembly 121 described above with reference to FIGS. 1 and 3.

Figure 11D:
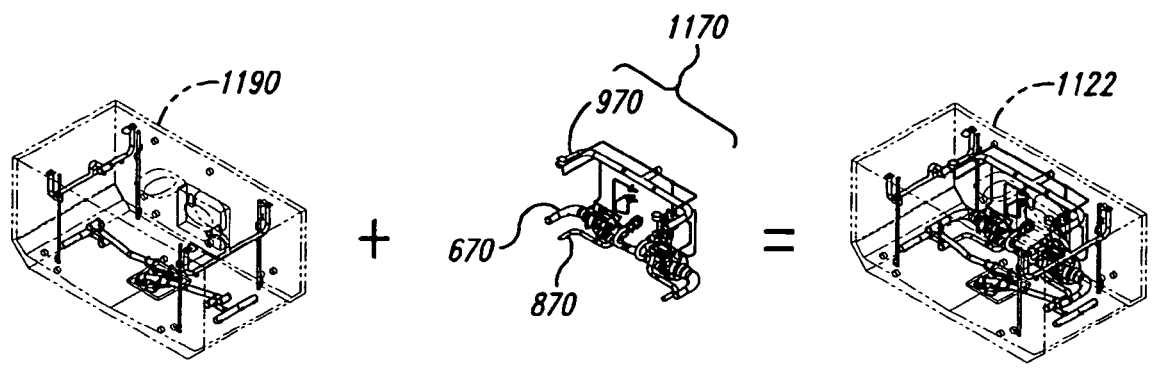
Figure 11E:
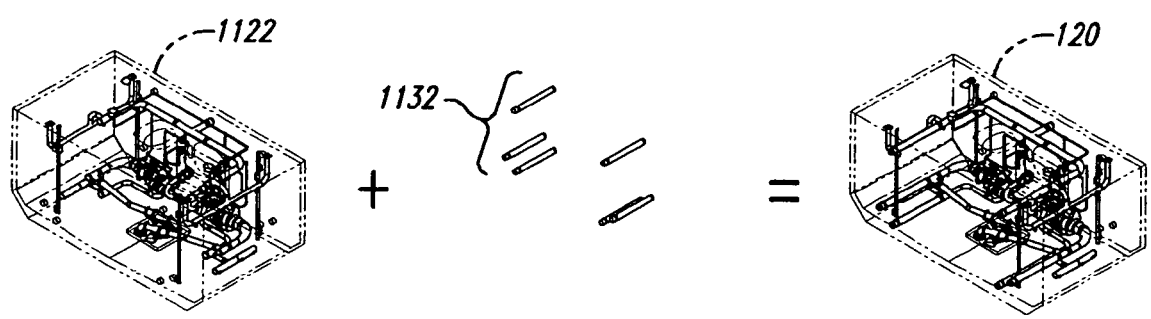

Referring next to FIG. 11D, in a further embodiment, master tank systems 1170 can be added to the basic tank assembly 1190 to produce a single master tank assembly 1122. The master tank systems 1170 can include the master tank portion 670 of the fuel outlet manifold 230 (FIG. 6), the master tank portion 870 of the fuel inlet manifold 240 (FIG. 8), and the master tank portion 970 of the vent manifold 250 (FIG. 9). In one embodiment, the single master tank assembly 1122 can be a master tank assembly that is configured for individual use without any corresponding slave tank assemblies. Alternatively, referring to FIG. 11E, in yet another embodiment, the manifold extension systems 1132 can be added to the single master tank assembly 1122 to create the master tank assembly 120 described above with reference to FIGS. 2-10.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method on an aircraft for providing fuel to at least one of an engine and an aerial refueling manifold during flight, the method comprising:

at least partially filling a first tank assembly with fuel in a fuselage of the aircraft by flowing fuel through a dual purpose inlet/outlet duct coupled to the first "tank assembly and positioned at least partially withen the first tank assembly;"

at least partially filling a second tank assembly with fuel in the fuselage of the aircraft by flowing fuel through the dual purpose inlet/outlet duct;

drawing fuel from the first tank assembly by operating a fuel transfer pump positioned in the first tank assembly;

while drawing fuel from the first tank assembly, drawing fuel through an inlet positioned in the second tank assembly by operating the fuel transfer pump positioned in the first tank assembly;

passing the fuel drawn from the first and second tank assemblies through the fuel transfer pump: and after passing the fuel drawn from the first and second tank assemblies through the fuel transfer pump, flowing the fuel out of the first and second tank assemblies to at least one of the engine and the aerial refueling manifold through the dual purpose inlet/outlet duct, wherein the dual purpose inlet/outlet duct is configured to transfer fuel from, and provide fuel to, the first and second tank assemblies.

2. The method of claim 1, wherein at least partially filling a first tank assembly with fuel includes at least partially filling a first tank assembly removably installed in a fuselage of the aircraft, and wherein at least partially filling a second tank assembly with fuel includes at least partially filling a second tank assembly removably installed in the fuselage at least proximate to the first tank assembly.

3. The method of claim 1, wherein at least partially filling the first and second tank assemblies with fuel before takeoff includes at least approximately simultaneously filling the first tank assembly and the second tank assembly.

4. The method of claim 1, further comprising:
removably installing the first tank assembly in a fuselage of the aircraft, the first tank assembly having a first aperture in a first end wall;
removably installing the second tank assembly in the fuselage of the aircraft, the second tank assembly having a second aperture in a second end wall, the second end wall of the second tank assembly facing the first end wall of the first tank assembly; and
extending a portion of a fuel duct through the first and second apertures.

5. A method on an aircraft for providing fuel to at least one of an engine and an aerial refueling manifold during flight, the method comprising:
at least partially filling a first tank assembly with fuel in a fuselage of the aircraft by flowing fuel through a dual purpose inlet/outlet duct coupled to the first "tank assembly and positioned at least partially withen the first tank assembly;"
at least partially filling a second tank assembly with fuel in the fuselage of the aircraft by flowing fuel through the dual purpose inlet/outlet duct;
drawing fuel from the first tank assembly through a first inlet operably coupled to a first portion of a fuel duct positioned in the first tank assembly;
while drawing fuel from the first tank assembly, drawing fuel from the second tank assembly through a second inlet operably coupled to a second portion of the fuel duct positioned in the second tank assembly:
passing the fuel drawn from the second tank assembly through the first tank assembly; and
after drawing the fuel from the first and second tank assemblies, transferring the fuel drawn from the first and second tank assemblies to at least one of the engine and the aerial refueling manifold through the dual purpose inlet/outlet duct, wherein the dual purpose inlet/outlet duct is configured to transfer fuel from, and provide fuel to, the first and second tank assemblies.

6. The method of claim 5, wherein passing the fuel drawn from the second tank assembly through the first tank assembly includes passing the fuel drawn from the second tank assembly through a tank interconnect bridging a gap between the first and second tank assemblies.

7. The method of claim 5, wherein passing the fuel drawn from the second tank assembly through the first tank assembly includes passing the fuel drawn from the second tank assembly through a first aperture in a first end wall of the first tank assembly and a second aperture in a second end wall of the second tank assembly.

8. A method on an aircraft for providing fuel to at least one of an engine and an aerial refueling manifold during flight, the method comprising:
at least partially filling a first tank assembly with fuel in a fuselage of the aircraft by flowing fuel through a dual purpose inlet/outlet duct positioned at least partially within the first tank assembly;
at least partially filling a second tank assembly with fuel in the fuselage of the aircraft by flowing fuel through the dual purpose inlet/outlet duct;
drawing fuel from the first tank assembly;
while drawing fuel from the first tank assembly, drawing fuel from the second tank assembly; and
after drawing the fuel from the first and second tank assemblies, transferring the fuel drawn from the first and second tank assemblies to at least one of the engine and the aerial refueling manifold through the dual purpose inlet/outlet duct positioned at least partially within the first tank assembly, wherein the dual purpose inlet/outlet duct is configured to transfer fuel from, and provide fuel to, the first and second tank assemblies.

9. The method of claim 8, wherein drawing fuel from the first tank assembly includes drawing fuel through a first portion of a first outlet duct operably coupled to a first branch of the dual purpose inlet/outlet manifold, and drawing fuel through a second portion of a second outlet duct operably coupled to a second branch of the dual purpose inlet/outlet manifold.

10. A method on an aircraft for providing fuel to at least one of an engine and an aerial refueling manifold during flight, the method comprising:
at least partially filling a first tank assembly with fuel in a fuselage of the aircraft;
at least partially filling a second tank assembly with fuel in the fuselage of the aircraft;
drawing fuel from the first tank assembly;
while drawing fuel from the first tank assembly, drawing fuel through an inlet positioned in the second tank assembly by operating a fuel transfer pump positioned in the first tank assembly;
passing the fuel drawn from the first and second tank assemblies through the fuel transfer pump; and
after passing the fuel drawn from the first and second tank assemblies through the fuel transfer pump, transferring the drawn fuel to at least one of the engine and the aerial refueling manifold through a dual purpose "inlet/outlet duct positioned at least partially within the first tank assembly, wherein the dual purpose inlet/outlet manifold is" configured to transfer fuel from, and provide fuel to, the first and second tank assemblies.

11. The method of claim 10, wherein at least partially filling a first tank assembly with fuel includes at least partially filling a first tank assembly removably installed in a fuselage of the aircraft, and wherein at least partially filling a second tank assembly with fuel includes at least partially filling a second tank assembly removably installed in the fuselage at least proximate to the first tank assembly.

12. The method of claim 10, wherein drawing fuel from the first tank assembly includes drawing fuel through a first inlet of an outlet manifold, the first inlet being positioned in the first tank assembly, and wherein drawing fuel from the second tank assembly includes drawing fuel through a second inlet of the outlet manifold, the second inlet being positioned in the second tank assembly.

13. The method of claim 10, further comprising passing the fuel drawn from the second tank assembly through a portion of a fuel duct positioned in the first tank assembly.

14. The method of claim 10, further comprising:
removably installing the first tank assembly in a fuselage of the aircraft, the first tank assembly having a first aperture in a first end wall;
removably installing the second tank assembly in the fuselage of the aircraft, the second tank assembly having a second aperture in a second end wall, the second end wall of the second tank assembly facing the first end wall of the first tank assembly; and extending a portion of a fuel duct through the first and second apertures, wherein drawing fuel from the second tank assembly includes drawing fuel through the fuel duct.

15. A method on an aircraft for providing fuel to at least one of an engine and an aerial refueling manifold during flight, the method comprising:

removably installing a first tank assembly in a fuselage of the aircraft, the first tank assembly having a first aperture in a first end wall;

removably installing a second tank assembly in the fuselage of the aircraft, the second tank assembly having a second aperture in a second end wall, the second end wall of the second tank assembly facing the first end wall of the first tank assembly;

extending a fuel duct through the first and second apertures and into the first and second tank assemblies;

operably coupling the fuel duct to a dual purpose inlet/outlet duct positioned in the first tank assembly, wherein the dual purpose inlet/outlet duct is configured to transfer fuel from, and provide fuel to, the first and second tank assemblies;

at least partially filling the first tank assembly with fuel by flowing fuel through the dual purpose inlet/outlet duct;

at least partially filling the second tank assembly with fuel by flowing fuel through the dual purpose inlet/outlet duct;

drawing fuel from the first tank assembly through a first inlet operably coupled to a first portion of the fuel duct positioned in the first tank assembly;

while drawing fuel from the first tank assembly, drawing fuel from the second tank assembly through a second inlet operably coupled to a second portion of the fuel duct positioned in the second tank assembly, and passing the fuel drawn from the second tank assembly through the first and second apertures via the fuel duct;

transferring the fuel drawn from the first and second tank assemblies to the dual purpose inlet/outlet duct via the fuel duct; and transferring the fuel from the dual purpose inlet/outlet duct to at least one of the engine and the aerial refueling manifold.

16. The method of claim 15, further comprising:

operably coupling a fuel transfer pump to the fuel duct in the first tank assembly, wherein drawing fuel from the first and second tank assemblies includes operating the fuel transfer pump to draw the fuel through the first and second inlets.

* * * * *

UNITED STATES PATENT AND TRADEMARK OFFICE
CERTIFICATE OF CORRECTION

PATENT NO. : 7,568,660 B2  Page 1 of 1
APPLICATION NO. : 11/441492
DATED : August 4, 2009
INVENTOR(S) : Mark E. Howe It is certified that error appears in the above-identified patent and that said Letters Patent is hereby corrected as shown below:

In column 12, line 45, delete "picollo" and insert -- piccolo --, therefor.

In column 12, line 45, delete "picollo" and insert -- piccolo --, therefor.

In column 14, line 46, in Claim 1, delete ""tank" and insert -- tank --, therefor.

In column 14, line 47, in Claim 1, delete "withen" and insert -- within --, therefor.

In column 14, line 48, in Claim 1, delete "assembly;"" and insert -- assembly; --, therefor.

In column 14, line 59, in Claim 1, delete "pump:" and insert -- pump; --, therefor.

In column 15, line 28, in Claim 5, delete ""tank" and insert -- tank --, therefor.

In column 15, line 29, in Claim 5, delete "withen" and insert -- within --, therefor.

In column 15, line 30, in Claim 5, delete "assembly;"" and insert -- assembly; --, therefor.

In column 15, line 40, in Claim 5, delete "assembly:" and insert -- assembly; --, therefor.

In column 16, line 39, in Claim 10, delete ""inlet/outlet" and insert -- inlet/outlet --, therefor.

In column 16, line 42, in Claim 10, delete "is"" and insert -- is --, therefor.

Signed and Sealed this

Twenty-ninth Day of June, 2010

David J. Kappos
*Director of the United States Patent and Trademark Office*